US008412123B2

(12) United States Patent
Foster

(10) Patent No.: US 8,412,123 B2
(45) Date of Patent: Apr. 2, 2013

(54) RADIO OPAQUE CONTAINER FOR COMMUNICATION DEVICES UPON A VEHICLE

(76) Inventor: Virginia E. Foster, Richmond Heights, MO (US)

( * ) Notice: Subject to any disclaimer, the term of this patent is extended or adjusted under 35 U.S.C. 154(b) by 436 days.

(21) Appl. No.: 12/839,905

(22) Filed: Jul. 20, 2010

(65) Prior Publication Data

US 2011/0014863 A1 Jan. 20, 2011

Related U.S. Application Data

(60) Provisional application No. 61/226,893, filed on Jul. 20, 2009.

(51) Int. Cl.
*H04B 1/38* (2006.01)

(52) U.S. Cl. ................. 455/90.3; 455/67.12; 455/575.8; 455/423; 455/227; 455/156.1; 455/134; 455/152.1; 455/228; 455/229

(58) Field of Classification Search ................. 455/90.3, 455/67.12, 575.8, 423, 227, 156.1, 134, 152.1, 455/228, 229; 340/539, 545.6, 552, 539.17, 340/545.1, 572.8; 324/750.26, 627, 763.01, 324/756.01, 750.27, 4
See application file for complete search history.

(56) References Cited

U.S. PATENT DOCUMENTS

| | | | | |
|---|---|---|---|---|
| 6,230,105 | B1 * | 5/2001 | Harris et al. | 702/57 |
| 6,657,214 | B1 * | 12/2003 | Foegelle et al. | 250/506.1 |
| 7,398,113 | B2 * | 7/2008 | Kozakai et al. | 455/575.7 |
| 2002/0137475 | A1 * | 9/2002 | Shou et al. | 455/90 |
| 2004/0012529 | A1 * | 1/2004 | Teshirogi et al. | 343/702 |
| 2005/0037825 | A1 * | 2/2005 | Faranda Cordella et al. | 455/575.9 |
| 2006/0232491 | A1 * | 10/2006 | Nakamura | 343/841 |
| 2009/0146862 | A1 * | 6/2009 | Malone | 342/1 |

OTHER PUBLICATIONS

Ramsey Electronics, LLC STE2800 Test Fixture, 2 pages of website.
Ramsey Electronics, STE, ShieldedTest Enclsoures, 3 pages of website.

* cited by examiner

*Primary Examiner* — Edward Urban
*Assistant Examiner* — Ganiyu A Hanidu
(74) *Attorney, Agent, or Firm* — Charles McCloskey

(57) ABSTRACT

A radio opaque container for communication devices upon a vehicle has a bottom joined to four walls, a pivoting lid sealing upon the walls, a connector from the container to a vehicle, a locking mechanism keeping the lid closed, and circuitry between the locking mechanism and the vehicle that engages the locking mechanism only when the vehicle's electrical system is on. In an emergency, the contents within the container remain available to a vehicle operator but the container opens only when vehicle's electrical power has been turned off. The container forms at least one faraday cage around the contents and prevents equipment placed therein from activating and distracting a vehicle operator. In an alternate embodiment, the container includes a shelf therein.

11 Claims, 5 Drawing Sheets

RADIO OPAQUE CONTAINER FOR COMMUNICATION DEVICES UPON A VEHICLE

CROSS-REFERENCE TO RELATED APPLICATION PATENTS

This non-provisional application claims priority to the pending provisional application 61/226,893 filed on Jul. 20, 2009 which is owned by the same inventor.

BACKGROUND OF THE INVENTION

The radio opaque container for communication devices upon a vehicle generally relates to cellular phone containers and more specifically to a container that locks when a vehicle moves. The present invention prevents inbound and outbound radio transmissions from a device placed in the container thus eliminating a distraction to a vehicle operator.

In the last thirty years, portable electronic devices have proliferated from their humble origins. Early portable telephones descended from military field phones and had a bulky shape commonly called a brick. Early portable phones had a telescoping antenna that extended from one end and sometimes required two hands to hold it near a person's mouth and ear. In the late 1980s and early 1990s, mobile subscriber radio telephones developed and portable telephones became bag phones, car phones, and cell phones. As portable electronic devices evolved, they became smaller and have more features.

Cell phones have become ubiquitous and ever present while becoming sleeker, slimmer, smoother, and smaller. The small size of cell phones allows them to fit readily into pockets, purses, bags, and other containers. Cell phones and their related equipment of personal digital assistants, or PDA, such as the popular Blackberry® and Bluetooth®, have made their way into vehicles of all description upon the land, the sea, and soon the air. Motorists have become familiar with other drivers distracted while using a cell phone while driving. Though hands free speakers and microphones exist, drivers remain reluctant to use them. Besides transmission of voice, cell phones and PDAs allow sending and receiving of text messages. The text messages comprise letter and numbers sent digitally and often when voice transmission has become difficult. Text messages though come from people entering the letters and numbers using the small keys of a cell phone, the slightly larger keys of a PDA, or even a thumbwheel. Entering text messages occupies at least one hand for the skillful and two hands for the lesser skilled users. Further, cell phones and PDAs have entered the cabs of various transportation vehicles including trucks and trains.

In a well publicized incident, a train engineer sent and received text messages from the cab of a train seconds before the train collided with vehicles in the vicinity of a railroad crossing. Though the text messages came from the engineer's own communications device, the transmission of text messages distracted the engineer, contributing to a train wreck with loss of life.

DESCRIPTION OF THE PRIOR ART

Over the years, others have sought to isolate communication devices from lesser skilled users. Communication devices, particularly portable ones, have remained in locked store rooms until time of usage. Portable devices have also remained in portable storage lockers, briefcases, and backpacks until needed. Various protocols have also regulated usage of portable communication devices in an attempt to limit distractions, particularly regarding vehicles. For many years, traffic safety agencies have urged motorists to pull off a road to make a cell phone call. Motorist compliance with such protocols has been spotty at best. Such protocols leave the motorist with discretion whether to make a cell phone call in a safe manner. More often, the motorist yields to convenience and time savings and makes a cell phone call, nowadays, even a text message, without stopping the car or truck. As the incident from the train relates, operators of other vehicles also do not stop their vehicle or do not stop usage of the communication device while the vehicle moves.

For many decades, metal boxes have seen use to store ammunition for mostly military but some civilian uses. The metal boxes, or ammo boxes, have an all steel construction with a hinged lid secured by a pivoting plate opposite the hinge. Though initially for ammunition storage, ammo boxes have further use as waterproof storage by boaters in various watercraft. An ammo boxes may hold various equipment that fits within the box. Ammo boxes remain portable and people can lift them from their handles for relocation to a desired location. Ammo boxes generally do not attach to a vehicle.

Ramsey Electronics of Victor, N.Y., has an STE2800, shielded test enclosure, for testing various wireless devices for radio frequencies. The STE2800 provides repeatable testing for various types of phones. The STE2800 has a built in and embedded antenna for the frequency range of 800 Mhz to 8 GHz. The STE2800 includes a system that clamps any phone into a secured position within the STE for testing. The STE2800 has a high radio frequency isolation factor along with various types of connectors. The STE2800 utilizes a radio frequency absorbing foam liner and a flush edge condition between the lid and the main body of the enclosure. However, the STE2800 lacks an electronic locking mechanism and an indicator light or other means showing closure of the device.

The present invention seeks to overcome the disadvantages of the prior art and provide additional advantages not heretofore shown. While the present invention serves many purposes, it accommodates the restrictions of each. The present invention has at least a bottom joined to four walls and a lid forming a box that accepts a cell phone or PDA and the box connects within the cab of a vehicle. The box of the invention, when closed, prevents the equipment within the box from sending or receiving radio transmissions and prevents a person from readily accessing the equipment secured therein. The need to reduce a distraction of an operator of a transportation vehicle drove the design of the present invention. Though cell phones and PDAs have been described, the present invention can accept other devices such Blackberry®, Blackjack®, portable tape recorders, camcorders, and other devices and keep them out of the vehicle operators reach.

SUMMARY OF THE INVENTION

Generally, the radio opaque container for communication devices upon a vehicle provides a container having a bottom joined to four walls, a pivoting lid sealing upon the walls spaced away from the bottom, a connector or bracket from the container to a vehicle, a locking mechanism keeping the lid closed, and circuitry between the locking mechanism and the vehicle that engages the locking mechanism only when the vehicle's ignition is on. Additionally, the circuitry also monitors whether the vehicle moves. In an emergency, the contents within the container remain handy to a vehicle operator but the container opens only when vehicle's electrical power has been turned off. The container forms at least one Faraday cage around the contents and prevents cell phones and PDA's placed therein from activating and distracting a vehicle operator. In an alternate embodiment, the container includes a shelf beneath which a cell phone, personal mobile devices, or PDAs can be stored. Preferably, the container and its walls, bottom, and lid are aluminum.

There has thus been outlined, rather broadly, the more important features of the invention in order that the detailed description thereof that follows may be better understood and that the present contribution to the art may be better appreciated. The present invention also includes various pivoting mechanisms between the lid and the bottom, various shapes for the bottom and corresponding lid, and mechanical, electrical or magnetic connections of the container to a vehicle.

The container attaches to a dashboard or interior front a vehicle generally within eyesight of the driver. The container connects to 12 volt electrical power provided by the vehicle or other source. The container installs with sheet metal screws, adhesive, or adhesive strips. The container generally installs in less than an hour.

The container has the goal of keeping a driver focused on the road. Following training and deployment of the container, each driver will understand that her best interest includes placing her cell phone into the container upon entering a vehicle and before starting it. Once inside the invention, the driver's cell phone may not send or receive calls and text message while the vehicle is running. Upon stopping the vehicle and turning off the engine, the container unlocks so the driver may remove her cell phone. Upon removing a cell phone from the container, the cell phone sends and receives calls and texts normally. Messages previously blocked when the cell phone was in the container now flow to the cell phone when out of the container. The container operates as simply as fastening a seat belt, adjusting mirrors, or performing other pre-trip checks. The container, as a simple addition to a pre-trip checklist, requires that the driver, before buckling a seat belt, places her cell phone and other devices into the cushioned and protective holding spaced of the container of this invention.

Following installation, the container requires little if any servicing. An installed container operates while the vehicle's engine runs and does not require adjustments or batteries. The container only draws current when the vehicle's engine runs, the vehicle's electrical system provides the electricity to operate the container.

The container remains a passive device that complies with FCC regulations. The container also does not interfere with cell phones and other devices outside of the container. Further, safety supervisors and fleet operators can readily check a vehicle to verify that the driver has placed all of her cellular devices into the container.

The container reduces drivers' concerns that their cell phone may be taken away. Drivers have noticed those states and municipalities that have banned the use and even possession of cell phones by drivers of vehicles. Laws that ban cell phone use in vehicles exist in many states. The laws vary in the degree of ban and upon what uses of cell phones are prohibited. These laws though seek to improve safety on the roads. Many have heard the news of a highway worker or other person put at risk because of a driver distracted by a cell phone, personal mobile device, or navigation aid. The container allows drivers to possess their cell phone in vehicles while maintaining focus upon the road. The driver of any motor vehicle will have her cellular device nearby in case of emergency and during approved breaks.

Seatbelts have saved numerous lives by altering driver and passenger behavior. The legal requirement of seat belts has made cars safer and accidents less fatal for those who use them. Seatbelts allow law enforcement to bring home the benefits of complying with the safety laws. Presently, most every passenger and driver knows to buckle up when they sit in a car or other vehicle. The present invention will save lives in a similar manner. However, laws in some situation are not always enough.

The container of the present invention passively blocks cell phone signals inside of a padded chamber. Upon placing a cell phone, or other personal mobile device, in the container before starting a vehicle on a trip, the driver dampens the temptation to send a text message while driving and also reinforces a safe pre-trip habit. The container remains closed and locked for the duration of the trip. The container prevents a driver from holding a cell phone and losing the use of a hand, ringing of the cell phone and distraction the driver, and securing the cell phone while the vehicle is running. Driver concentration on the road and surroundings increases.

The container still allows a driver to have a cell phone nearby for emergency use. The container also does not interfere with passenger cell phone or other personal mobile devices.

Roads and highways will be safer routes when every driver uses the container of the present invention to block out driver cell phones. The present invention has no need for complicated software applications that prove difficult to enforce. Unlike software applications that allow a driver to hold a cell phone, the container of the invention eliminates temptations by placing a physical barrier between a driver and the cell phone while allowing emergency access to the cell phone when needed. The present invention also does not us active signal blocking devices that interfere with safety communications and cell phones of passengers in the same vehicle as the driver. The container of the present invention provides a solution to the problem of driver distraction. The container has low cost, ready installation, low maintenance, and ready enforcement.

Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved container that prevents inbound and outbound radio transmissions from a cell phone or PDA placed therein.

Another object is to provide such a radio opaque container that removes a distraction from an operator of a vehicle.

Another object is to provide such a radio opaque container that prevents a temptation of an operator of a vehicle by nearby accessible communications equipment.

Another object is to provide such a radio opaque container that permits access to equipment placed therein during an emergency.

An another object is to provide such a radio opaque container that keeps equipment within reach of a vehicle operator but reduces the temptation of the vehicle operator to use the equipment.

An another object is to provide such a radio opaque container that preserves the vehicle operator's right to speech and the right to possess a cell phone while greatly reducing the temptation by a cell phone towards the vehicle operator.

Another object is to provide such a radio opaque container that has a low cost of manufacture so the consuming public and agencies may readily purchase and install the container into existing vehicles with a minimum of retrofitting expense.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
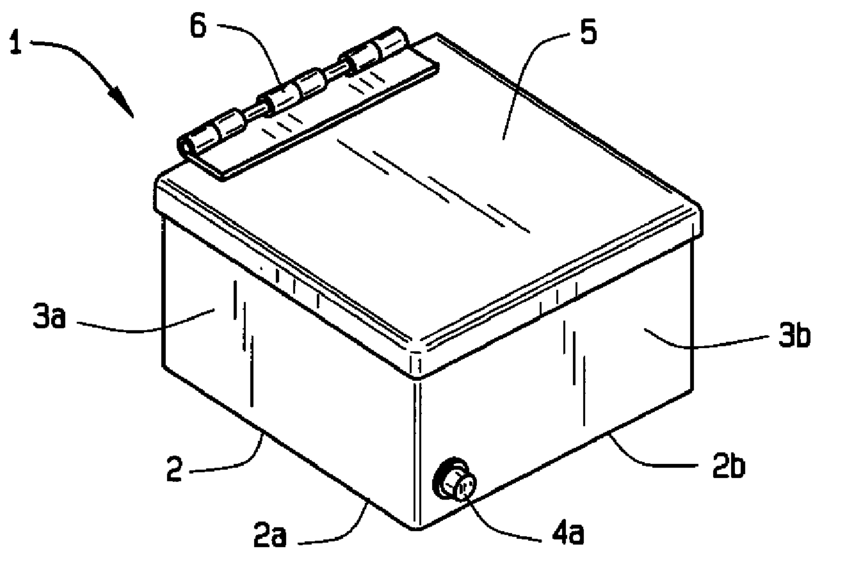
FIG. 1 shows an isometric view of the present invention.

The present art overcomes the prior art limitations by providing a container 1 that connects to a transportation vehicle such as an automobile, truck, or train, not shown. The container allows a driver or other user to place a cell phone, portable digital assistant, or other communications equipment, as at P, into the container. The container, generally made of a material that conducts electricity, such as aluminum, ferrous metal and steel, becomes a faraday cage that blocks inbound and outbound radio transmissions from a device P placed inside the container 1 as later shown in FIG. 1*a*. Here, FIG. 1 shows the closed container 1 in an isometric view as a user would see it. The container has a generally planar bottom 2 with a perimeter and at least one wall upon the perimeter general perpendicular to the bottom. The bottom has two mutually parallel and spaced apart longitudinal sides 2*a* each perpendicular to two mutually parallel and spaced apart lateral ends 2*b*. The longitudinal sides 2*a* are generally longer than lateral ends 2*b* where the sides and ends are upon the perimeter of the bottom. Perpendicular to the bottom, the container has at least one wall that includes two mutually parallel and spaced apart sidewalls 3*a* and two mutually parallel and spaced apart endwalls 3*b* perpendicular to the sidewalls. The sidewalls and endwalls each have a thickness and join by welding along their common corners generally extending upwardly from the corners of the bottom 2. Opposite the bottom 2, each sidewall and endwall has a top edge upon which rests the lid 5, more precisely the outer lid. The outer lid has a generally rectangular shape and perimeter similar to that of the bottom that overlaps the top edge of both sidewalls 3*a* and one endwall 3*b*. This endwall, as shown, also has an indicator light 4*a* proximate its lower left corner as shown. Opposite the endwall with the indicator light, the container has another endwall having a hinge 6 across its top edge. The hinge connects to the outer lid 5 upon one of its lateral edges and to the other endwall.

Figure 1A:
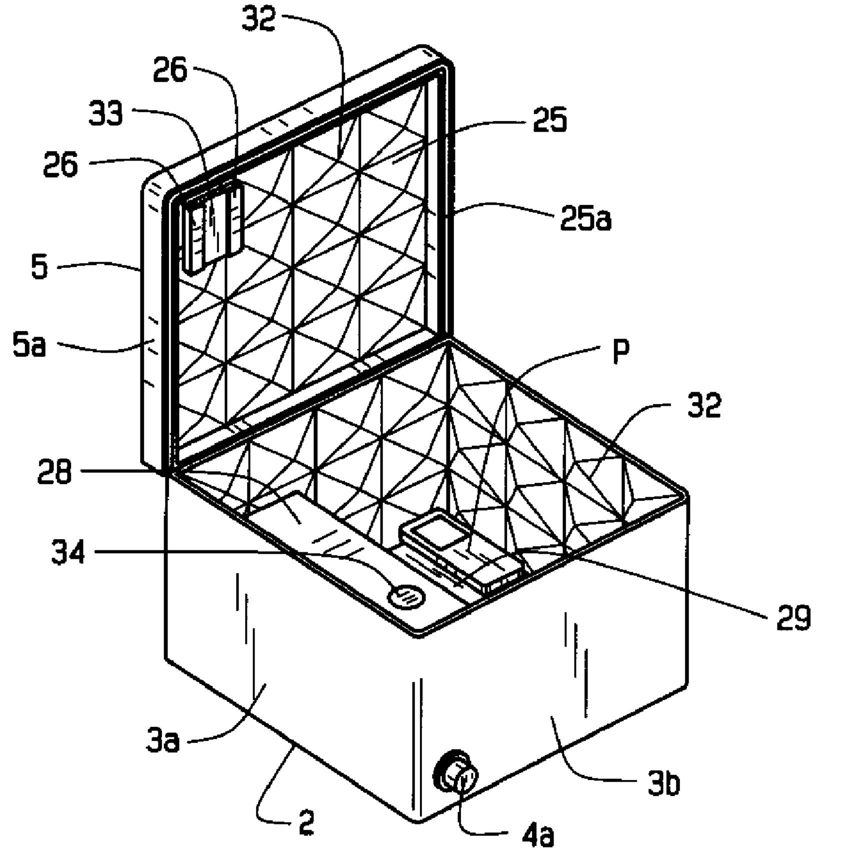
FIG. 1*a* shows an isometric view of the present invention with a cell phone placed therein.

FIG. 1*a* provides the container 1 with a bottom 2, generally planar and here shown as rectangular. The bottom has two mutually parallel and spaced apart longitudinal sides 2*a* and two mutually parallel and spaced apart lateral ends 2*b* generally perpendicular to the sides. Extending perpendicular to the bottom upon the sides and the ends, the container has a wall 3 having sidewalls 3*a* and endwalls 3*b* that correspond to the sides 2*a* and ends 2*b* of the bottom. Each sidewall joins to an endwall at a ninety degree angle. Upon one endwall, the container has at least one indicator light 4*a*, or light emitting diode LED, that illuminates when the container has locked the lid 5 upon the remainder of the container. Alternatively, the container has additional LED indicating various phases of operation for the invention. And upon one sidewall 3*a* generally opposite the bottom 2, a lid 5 pivotally connects to the sidewall. The lid covers the space within the container and generally has a hinged connection as at 6. The hinge can be of the piano type, a butt hinge, two spaced apart straps and the like. In an alternate embodiment, the hinge includes a self closing spring or other biasing member. Generally centered upon the lid and opposite the hinge 6, the lid has a locking mechanism 7 that generally engages upon detection of the vehicle's electrical system being energized and disengaged upon no longer detecting activity in the vehicle's electrical system. The locking mechanism secures the lid to one of the walls. Alternatively, the locking mechanism engages when motion of the vehicle is detected. In a further alternate embodiment, the container includes a closing mechanism that brings the lid upon the wall shortly after energizing the vehicle electrical system and that then opens the lid after the vehicle shuts off.

The container has sufficient size to store at least one cell phone, personal mobile devices, or other electronic communications equipment, for two or more personal mobile devices a user may stack the devices within the container. Though the lid attaches to a sidewall, the Applicants foresee alternate locations of attachment for the lid and the hinge. Though described as a rectangular box, the container may have alternate shapes provided that at least one faraday cage is established. The within the walls, the bottom, and the lid forms a faraday cage that prevents a personal electronic device from receiving and transmitting radio signals when placed within the container beneath a closed lid.

Upon the underside of the lid, that is, the inner lid 25, later shown in FIGS. 6, 7, that has grips 26 that retain a magnetically attractive plate, preferably a steel plate 33, generally proximate the upper left corner of the inner lid that approaches the endwall 3*b* having the indicator light during closing of the lid. A magnet 34 has sufficient strength to attract the steel plate to it. The steel plate and the magnet cooperate as the locking mechanism 7 where the magnet holds the steel plate, that is, the lid 5 closed upon the container during the typical bumps encountered as a vehicle travels. Further, the interior surfaces, those not seen by a user with the lid closed, of the endwalls, sidewalls, and inner lid have a liner or padding 32 attached. The padding cushions and prevents impact damage to personal mobile devices placed within the container as they may move during vehicle operations. The padding also has some radio signal attenuating ability. The padding may be felt of select weight or a material having geometric properties, such as cones, or hemispheres that attenuate radio signals.

The container also includes a shelf 28 within its interior that generally covers the electrical components of the invention and prevents a user from tampering with them. The shelf extends from one endwall 3*b* to the other endwall 3*b*, generally from the hinged end of the container to the opposite end including at least one indicator light 4*a*. The at least one indicator light illuminates when the container has locked. The shelf extends partially across the width of the container, generally less than half of the width, as shown, towards the indicator light. The shelf connects to the bottom 2 and one sidewall 3*a* as later shown and described in FIGS. 6, 7. The space beneath the shelf may form a second faraday cage that prevents reception and transmission of radio signals to and from any personal electronic device placed adjacent to the shelf.

Figure 2:
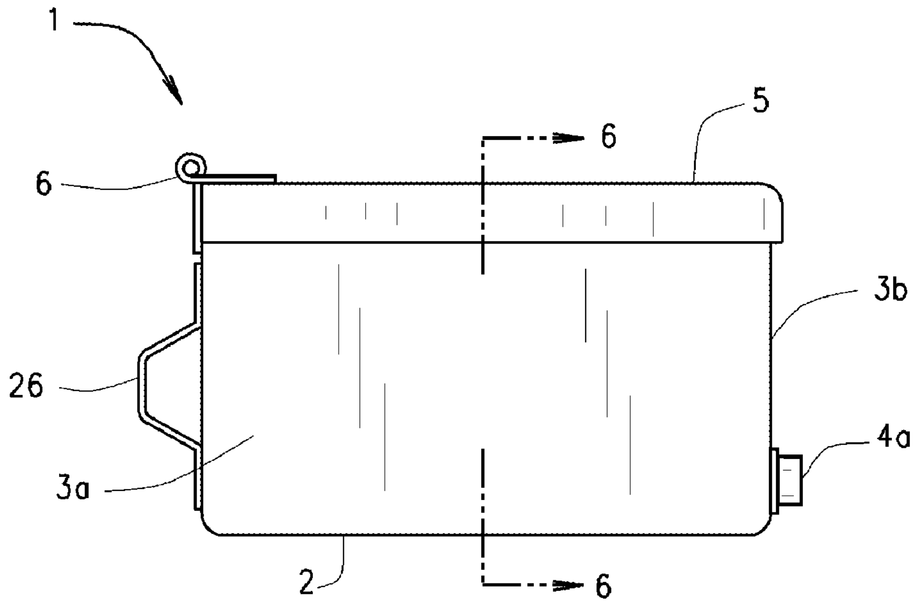
FIG. 2 describes a side view of the invention.

FIG. 2 then shows the container 1 from a side view, here the left side in relation to a user. This sidewall 3*a* has a generally elongated rectangular shape perpendicular to the bottom 2. To the right of the figure, the endwall 3*b*, here shown on edge, has the indicator light 4*a*. Opposite the indicator light, the other endwall 3*b* has a mounting bracket 26 extending outwardly from the container. The mounting bracket serves as a means to connect the container to the vehicle, generally in the vicinity of the dashboard, that is, the driver. The mounting bracket provides for a firm mechanical or welded connection of the container to the vehicle. The connecting means, or bracket, is generally positioned beneath the hinge so that the lid opens readily when the locking mechanism opens. In particular, the container must be grounded to the frame of the vehicle to attenuate the majority of signals for cell phones and other personal mobile devices. The mounting bracket extends farther from the endwall than the hinge 6. The hinge has a generally strap hinge like form with two leaves, one leaf joined to the endwall and the other leaf joined to the lid 5. The leaves share a common pin connection. The lid also extends downwardly along the top portion of the sidewalls and the endwalls as shown.

Figure 3:
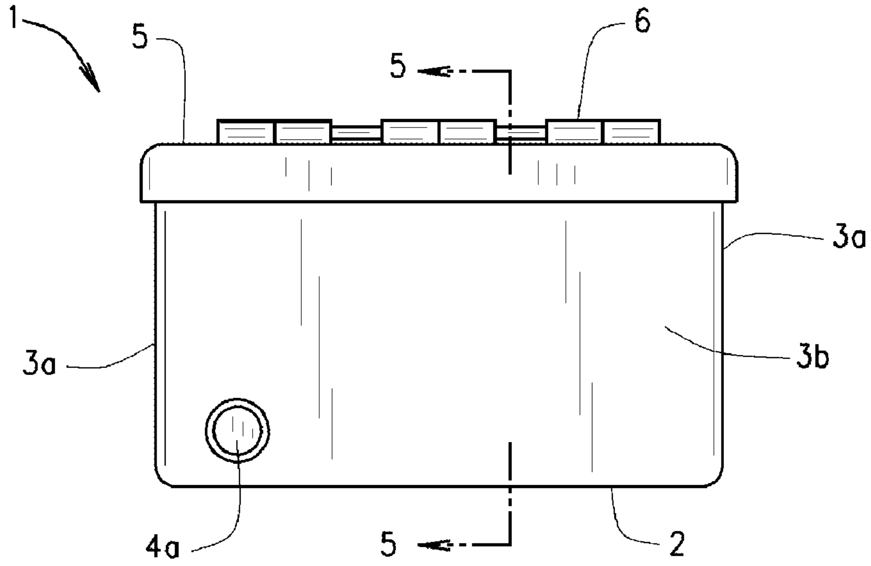
FIG. 3 shows a front view of the invention as seen by a user.

Turning the container again, FIG. 3 has a front view of the invention as a user would see it in a vehicle, such as a bus, train, truck, or car. The container has one of its endwalls 3*b* extending perpendicular to the bottom 2. The endwall has a generally rectangular shape and joins to the two perpendicular sidewalls. Proximate one of the lower corners, here shown as lower left, the endwall has the indicator light 4*a*. Opposite the bottom, the lid 5 closes upon the top edges of the endwall in this figure and the two sidewalls. The lid folds downwardly from the plane of the lid and extends partially down the two sidewalls and the endwall shown in this figure. In the background of this figure, the hinge 6 connects to the lid 5.

Figure 4:
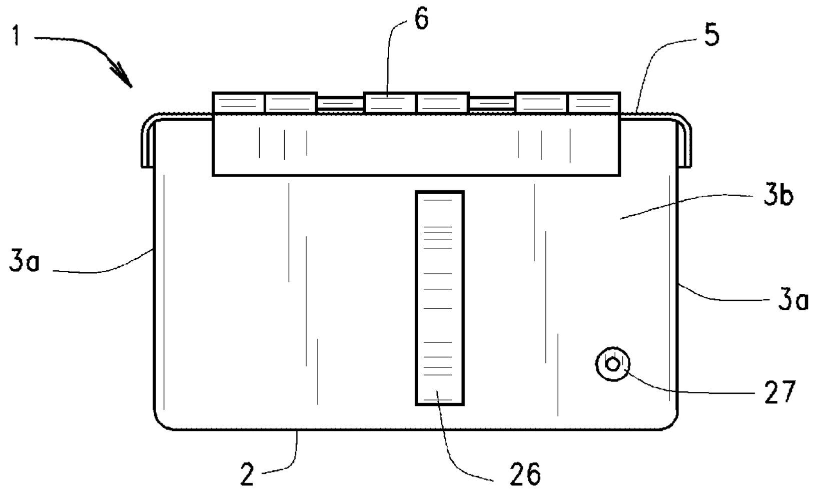
FIG. 4 describes an end view of the present invention ready for connection to a vehicle.

Opposite the view in FIG. 3, FIG. 4 shows the container 1 from a back view where it connects and grounds to a vehicle. The back is generally the endwall 3*b* opposite the endwall with the indicator light 4*a* previously shown. The endwall in this figure has a generally rectangular shape much like the previous endwall. The endwall extends perpendicular to the bottom from a lateral edge 2*b*. The endwall joins to the two sidewalls. Generally centered in the endwall, the mounting bracket 26 allows for connection of the invention to a vehicle. The bracket is generally narrow and occupies a rectangular footprint, here shown perpendicular to the bottom. Alternatively, the container secures to the vehicle by bolting through the bottom 2 and a Mylar piece is provided as a cover for the bolt head within the container. Proximate the lower right corner in this figure, a bushing 27 provides for admission of wiring into the container for delivering electrical power to the magnet 34 and LED 4*a*. The bushing also allows for limited venting of the container to prevent creation of vacuum therein. Above the bracket and centered upon the top edge of the endwall, the hinge 6 joins to the endwall using one leaf and to the lid 5 using the other leaf. Along this edge of the lid, the lid has a generally flat edge that does not fold downwardly along the top of the endwall.

Figure 5:
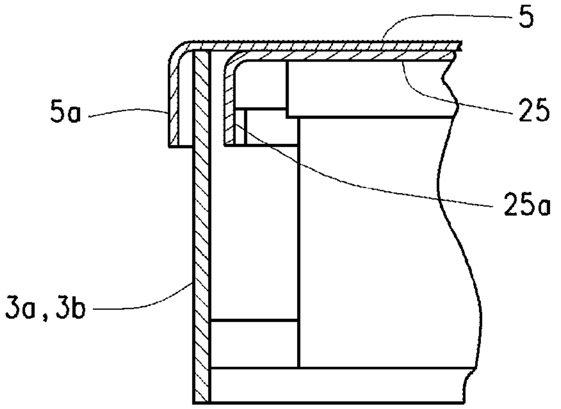
FIG. 5 illustrates a detailed view of the lid to wall connection.

The sidewalls and the endwall with the indicator light each receive the lid 5 upon their top edges and the lid extends downwardly along the sidewalls and the one endwall as shown in FIG. 5. FIG. 5 shows a detailed view of how the lid fits upon the sidewalls and the endwall. More precisely, the lid 5 is an outer lid that extends between both sidewalls and both endwalls and overlaps both sidewalls and one endwall. The outer lid, as at 5, folds downwardly its lip as at 5*a*. The outer lid rests squarely upon the top edge of the sidewalls and one endwall while its lip 5*a* extends downwardly at least 0.25 inches. Beneath the outer lid 5, the container has an inner lid 25 generally adjacent to the outer lid. The inner lid has a generally rectangular planar shape and perimeter that spans just short of sidewall to sidewall and endwall to endwall. The inner lid is slightly smaller in width and length than the outer lid. Upon its four perimeter edges, the inner lid has its lip 25*a* that folds downwardly, generally parallel to the lip 5*a* of the outer lid. The lips 25*a* of the inner lid and the lips 5*a* of the outer lid fit snugly upon the sidewalls and endwalls of the container minimizing signal intrusion into the container 1. The lips of the inner lid and the outer lid are generally mutually parallel and spaced apart by the thickness of the adjacent wall. The lips 5*a*, 25*a* of the lids 5, 25, create radio frequency redundancy that attenuates, and to some extent scrambles, any radio signals within the container further isolating cell phone P or other device placed within the container of the invention.

Figure 6:
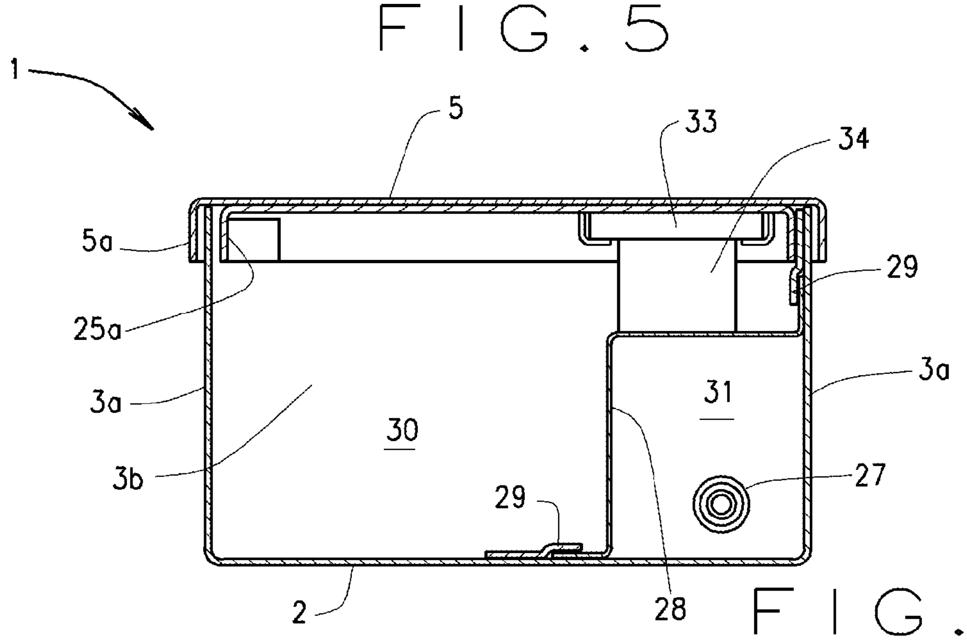
FIG. 6 provides a section view of the invention.

FIG. 6 then shows a section through the interior of the container that parallels a sidewall or length of the container. The container 1 has its bottom 2, an endwall 3*b* perpendicular to the bottom in the background and generally supporting the hinge, and two sidewalls 3*a* here shown on edge and spaced apart. The endwall 3*b* has the bushing 27 towards one corner, here shown as the lower right. The bottom has a slot 29 welded to it while the sidewall 3*a* proximate the bushing 27 also has a slot 29 welded to it. Both slots are spaced away from the nearest corner. The slots are generally a strip with one longitudinal edge offset from the remainder of the slot. The two slots then receive edges of a shelf 28 beneath their offset longitudinal edges as shown. The shelf has a generally L shape rotated ninety degrees clockwise. The shelf 28 forms a subspace 31 generally beneath the shelf and within the endwall to the right of the figure and the bottom. The subspace provides containment for the electrical wiring, components, and locking mechanism, particularly the electromagnet 34. The shelf 28 and the subspace extend upwardly for approximately half of the height of the container while the shelf extends less than half the width of the container as shown. The subspace also operates as a faraday cage if needed. Upon the shelf and above the subspace, the container has an electromagnet 34. The electromagnet energizes upon supply of power from the vehicle electrical system, primarily when the ignition switch is ON. The electromagnet thus attracts a steel plate 33 held adjacent and beneath a portion of the inner lid by the grips 26. Outwardly from the shelf, beneath the inner lid 25, the other endwall 3*a*, and the bottom 2, the container has its space 30 that receives the cell phone or other personal mobile device.

Figure 7:
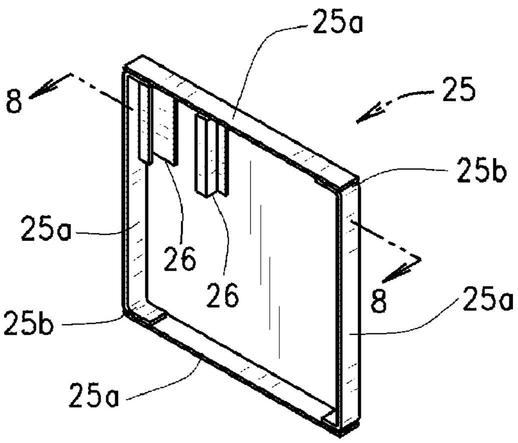
FIG. 7 shows an isometric view of the inner lid of the invention.
Figure 8:
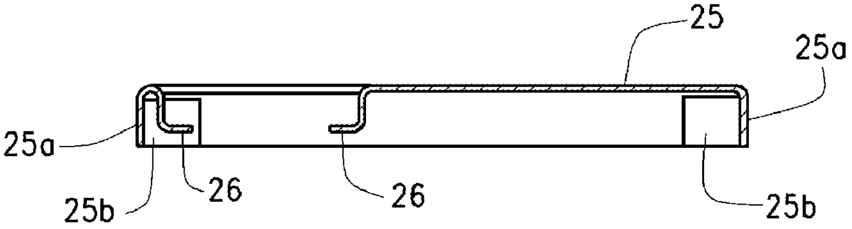
FIG. 8 shows a sectional view of the inner lid.

As shown in FIG. 6, above the shelf, the inner lid has additional structure shown in FIGS. 7, 8. FIG. 7 shows an isometric view of the inner lid with its inside visible. The inside of the inner lid spans the container but fits within the sidewalls and the endwalls as shown in FIG. 5. The inner lid has a generally planar rectangular shape with lips 25*a* each folding perpendicular to the remainder of the inner lid. The four lips fold in the same direction, that is, towards the container when installed. Each lip has a tab folded perpendicular to the length of the lip at one end for joining to an adjacent lip as at 25*b*. Proximate the upper left corner of the inner lid, as shown, the inner lid has two mutually parallel and spaced apart grips 26. The grips extend inwardly from the inner lid in the same direction as the lips 25*a*. The grips are generally elongated rectangles with one longitudinal edge offset from the other. The grips have their offset to receive a magnet, not shown. The grips generally weld to the underside of the inner lid.

FIG. 8 provides a sectional view through the inner lid 25 and the grips 26. From the left, the inner lid 25 has its lip 25*a* extending downwardly and perpendicular to the plane of the inner lid. Inwardly from that lip, the inner lid has one grip 26. The offset of the grip is generally parallel to but spaced beneath the plane of the inner lid. In the background behind the grip, the lips join upon the tab 25*b*. Spaced away from the first grip, a second grip 26 has a portion coplanar with the first grip for receiving the magnet. The second grip joins mutually parallel to but beneath the inner lid. Outwardly from the second grip, the lip 25*a* continues in the background to the tab 25*b* on the right for its joining to the lip 25*a* shown on edge on the right of the figure.

Figure 9:
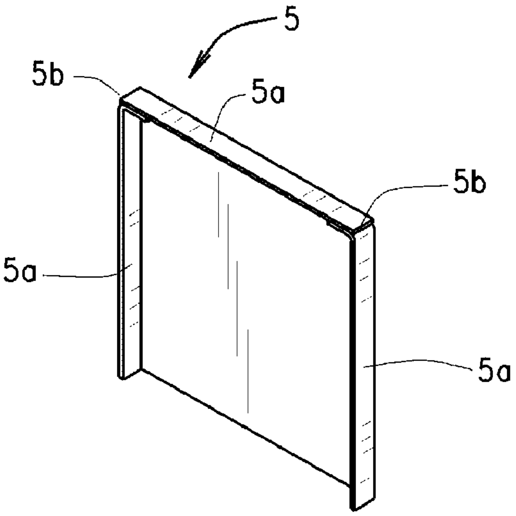
FIG. 9 shows an isometric view of the outer lid of the invention.

Slightly larger than the inner lid, the outer lid 5 appears in an isometric view in FIG. 9 similar to that of FIG. 7. The outer lid 5 has a generally planar rectangular shape. The outer lid has lips 5*a* to span downwardly upon one endwall and both sidewalls of the container. The outer lid lacks a lip upon the edge where the hinge 6 joins as previously shown. The lips join at two corners using tabs 5*b* welded to an adjacent lip. The lips 5*a* of the outer lid are slightly longer than the lips 25*a* of the inner lid to account for thickness of material for the outer lid. The lips 5*a* of the outer lid and those lips 25*a* of the inner lid have a common height above the bottom when the lid is closed upon the container as shown in FIG. 5.

Figure 10:
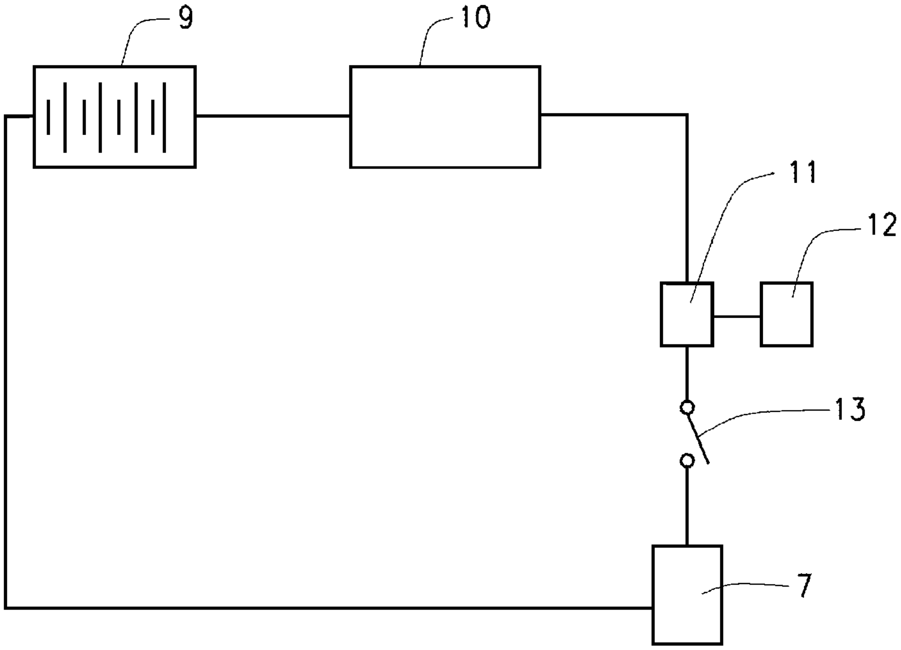
FIG. 10 describes a circuit diagram showing the connection of the present invention to the electrical system of a vehicle.

Turning to the workings of the container, FIG. 10 provides a circuit diagram showing the connection of the device to the electrical system of the vehicle. The electrical system includes a battery as at 9 in communication with a fuse box as at 10. The container, particularly through the bushing 27, draws power from the fuse box of the vehicle's electrical system. Alternatively, electrical power enters a sensor, as at 11. The sensor determines the presence or absence of electrical power. Upon detecting the presence of electrical power from the vehicle, the sensor permits the power to flow onward into the circuit. In an alternate embodiment, the circuit includes an accelerometer as at 12 that detects motion of the vehicle. In the presence of motion, the accelerometer allows electrical power to flow onward into the circuitry of the invention. After the sensor 11 or the accelerometer, the container includes a first switch 13 that closes in the presence of electrical power. Upon closing the first switch, the circuit completes and provides electrical power to the lock mechanism as at 7. The lock then engages and secures the lid to the remainder of the container while the vehicle is on or alternatively in motion. In the preferred embodiment, the lock mechanism includes an electromagnet 34 that attracts a steel plate 33 held on the underside of the inner lid. A phone P or other device placed within the container remains beneath the locked lid which prevents a vehicle operator from using it, thus reducing one more distraction in the cab of a vehicle. The lock 7 activates only when the vehicle's electrical system is on or alternatively when the accelerometer detects motion. During emergency situations, turning the vehicle off disengages the lock mechanism 7 and allows access to a phone P placed therein.

Figure 11:
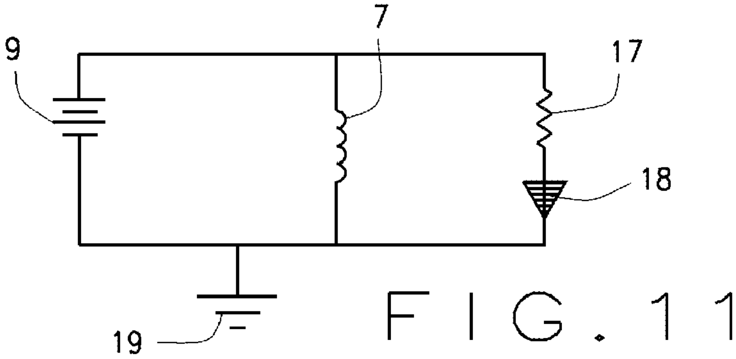
FIG. 11 describes a circuit diagram for the locking mechanism of the present; and, FIG. 11*a* shows an alternate circuit diagram for the locking mechanism.

FIG. 11 provides a circuit diagram showing the supply of power to the lock mechanism 7. The circuit begins with 12 volt current supplied from the vehicle's electrical system, here shown as the battery symbol as at 9. The power proceeds into a parallel circuit where one branch delivers power to the locking mechanism 7 and the other branch delivers power to a resistor 7, generally 1 k Ohm, in series with one LED 18. Generally upon supplying power to this circuit, the locking mechanism closes and the LED illuminates so that the lid remains shut upon the container, keeping the personal mobile device away from the driver when a vehicle operates. This circuit also has a ground 19 to the vehicle's ground system so that the faraday cages operate normally.

Figure 11A:
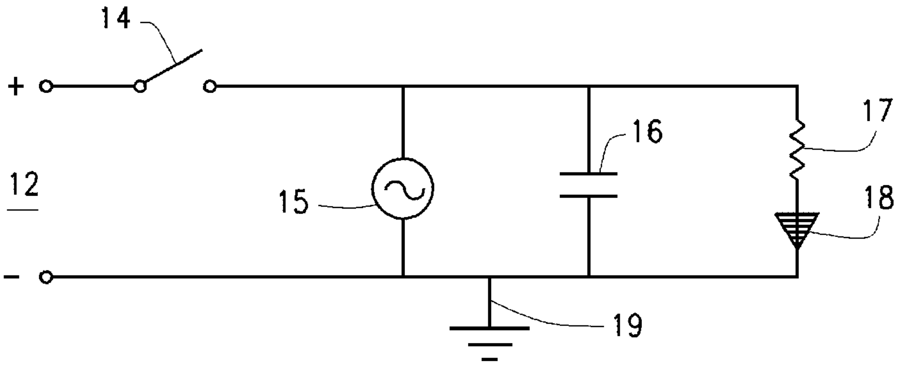

FIG. 11*a* then shows the workings of the lock 7 in an alternate circuit diagram. The lock receives electrical power from the vehicle's electrical system as described above, the power enters the lock circuit and proceeds to a second switch 14 that closes in the presence of electrical power and when the lid 5 has closed upon the container. The closed switch completes a circuit that delivers power to a lock motor 15 that rotates a tab or advances a blade from the lock into a cooperating slot on an endwall. The tab or blade when in the slot prevents a vehicle operator from opening the lid until the power ceases flowing to the container. The circuit also includes a capacitor 16 in parallel to the motor and then a resistor 17 with an LED 18, light emitting diode, also in parallel to the motor. The LED illuminates when the lid has closed upon the sidewalls of the container. The circuit shown in FIG. 11*a* has a ground 19 generally back to the vehicle's grounding system or frame.

The container has interior padding, 32, as shown in FIG. 1*a*, and installs inside the cab of a vehicle. The padding minimizes damage to personal mobile devices placed within the container and attenuates some radio frequencies. During usage of the container, a driver or an operator places all personal mobile devices into the interior of the container. The operator then starts the vehicle normally. While the ignition of the vehicle remains on, the container has its lid closed and remains locked to an endwall or sidewall. The personal mobile devices rest safely inside the container which does not allow them to send or to receive signals. An LED indicates when the unit has locked. Then when the driver has turned off the ignition, the container unlocks so that the operator can retrieve the personal mobile devices.

From the aforementioned description, a radio opaque container for communications equipment, such as cell phones and personal mobile devices, has been described. The container is uniquely capable of enclosing contents and preventing radio communication with the contents when connected to a vehicle. The container remains closed while the electrical system of the vehicle is active or the vehicle moves. The container and its various components may be manufactured from many materials, including but not limited to, ferrous metals, aluminum grade 5052, thermo plastic resins, polymers, polyvinyl chloride, nylon, and composite fabrics.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the is present invention.

I claim:

1. A container temporarily preventing reception and transmission of signals by communications equipment placed therein, said container adapted to connect proximate a dashboard of a transportation vehicle, said container comprising:

a bottom having a perimeter;

at least one wall upon said bottom, said wall being generally perpendicular to said bottom and positioned upon the perimeter of said bottom, said wall having a thickness;

at least one lid hingedly connecting to said wall, said at least one lid closing upon said at least one wall completely covering said bottom;

a locking mechanism securing said at least one lid to said at least one wall wherein said at least one lid covers the space within said at least one wall, said locking mechanism locking when said container detects operation of the transportation vehicle and said locking mechanism unlocking when said container does not detect operation of the transportation vehicle;

wherein said bottom, said at least one wall, and said at least one lid form at least one faraday cage adapted to prevent reception and transmission of signals by communication containers placed within said container;

wherein said container is adapted to connect to the grounding system of the transportation vehicle; and, wherein said container allows access to communication equipment placed therein when said locking mechanism unlocks said at least lid from said at least one wall.

2. The reception and transmission of signals prevention container of claim 1 further comprising:

a liner upon said at least one wall, upon said bottom, and beneath said at least one lid, said liner providing cushioning to contents placed within said container and providing partial radio signal attenuation.

3. The reception and transmission of signals prevention container of claim 1 further comprising:

said bottom being planar and rectangular in shape;

two mutually parallel and spaced apart endwalls, one of said endwalls positioning outwardly from the dashboard of the transportation vehicle;

said at least one lid hingedly connecting to one of said endwalls positioning proximate the dashboard of the transportation vehicle;

two mutually parallel and spaced apart sidewalls generally perpendicular to said endwalls; and, an accelerometer cooperating with said locking mechanism, said accelerometer adapted to detect motion of the transportation vehicle wherein said accelerometer overrides said locking mechanism and allows access within said container so long as the transportation vehicle remains stationary.

4. The reception and transmission of signals prevention container of claim 1 further comprising:

an outer lid, generally planar, having a perimeter and at least one lip upon the perimeter, said at least one lip being perpendicular to the generally planar shape of said outer lid;

an inner lid, generally planar, slightly smaller in width and length than said outer lid, having a perimeter and at least one lip upon the perimeter, said at least one lip being perpendicular to the generally planar shape of said inner lid wherein said at least one lip of said inner lid is generally parallel to said at least one lip of said outer lid, and wherein said at least one lip of said inner lid is spaced apart from said at least one lip of said outer lid by the thickness of said at least one wall;

wherein said at least one lip of said outer lid and said at least one lip of said inner lid create radio frequency redundancy thus attenuating signals further within said container;

said inner lid having two mutually parallel and spaced apart grips; and, said container having a steel plate positioning with said grips and said locking mechanism having an electromagnet positioning beneath said steel plate.

5. The reception and transmission of signals prevention container of claim 4 further comprising:

a shelf positioning within said at least one wall and being generally parallel to said bottom, said shelf forming a second faraday cage; and, said electromagnet positioning upon said shelf away from said bottom.

6. The reception and transmission of signals prevention container of claim 1 further comprising:

a means to connect adapted to secure said container proximate the dashboard of the transportation vehicle;

said connecting means positioning said container where said at least one lid opens readily when said locking mechanism unlocks; and, at least one light emitting diode illuminating when said locking mechanism locks said at least one lid upon said at least one wall.

7. The reception and transmission of signals prevention container of claim 6 further comprising:

said connecting means including a bracket, extending outwardly from said at least one wall generally beneath said hinge.

8. A device temporarily preventing reception and transmission of signals by communications equipment placed therein, said device adapted to connect proximate a dashboard of a transportation vehicle, said device comprising:

a container, having a bottom with a perimeter, at least one wall upon said bottom, said wall being generally perpendicular to said bottom and positioning upon the perimeter of said bottom, and said wall having a thickness;

at least one lid hingedly connecting to said wall, said at least one lid closing upon said container atop said at least one wall and completely covering said bottom;

a locking mechanism securing said at least one lid upon said container when closed wherein said at least one lid covers the space within said container, said locking mechanism locking when said container device detects operation of the transportation vehicle and said locking mechanism unlocking when said device no longer detects operation of the transportation vehicle and allowing access to communication devices placed therein;

wherein said container and said at least one lid form at least one faraday cage preventing reception and transmission of signals by communication equipment placed within said container; and, wherein said container is adapted to connect to the grounding system of the transportation vehicle.

9. The reception and transmission of signals prevention device of device claim 8 further comprising:

an accelerometer adapted to detect motion of the transportation vehicle wherein said accelerometer allows access within said container so long as the transportation vehicle remains stationary; and, at least one light emitting diode illuminating when said locking mechanism locks said at least one lid upon said at least one wall of said container.

10. The reception and transmission of signals prevention device of device claim 8 further comprising:

an outer lid, generally planar in shape, having a perimeter and at least one lip upon the perimeter, said at least one lip being perpendicular to the generally planar shape of said outer lid;

an inner lid, generally planar in shape, slightly smaller in width and length than said outer lid, having a perimeter and at least one lip upon the perimeter, said at least one lip being perpendicular to the generally planar shape of said inner lid wherein said at least one lip of said inner lid is generally parallel to said at least one lip of said outer lid, and wherein said at least one lip of said inner lid is spaced apart from said at least one lip of said outer lid by the thickness of said at least one wall;

said inner lid having two mutually parallel and spaced apart grips;

said device having a steel plate positioning with said grips and said locking mechanism having an electromagnet positioning beneath said steel plate; and, a bracket extending outwardly from said at least one wall generally beneath said hinge, said bracket adapting to secure said container proximate the dashboard of the transportation vehicle, said bracket being in communication with the grounding system and the electrical system of the transportation vehicle.

11. The reception and transmission of signals prevention device of device claim 10 further comprising:

a shelf positioning within said container and being generally parallel to said bottom, said shelf forming a second faraday cage; and, said electromagnet positioning upon said shelf away from said bottom.

* * * * *